(12) United States Patent
Cho

(10) Patent No.: US 12,430,488 B2
(45) Date of Patent: *Sep. 30, 2025

(54) METHODS OF DESIGNING LAYOUT OF SEMICONDUCTOR DEVICE AND METHODS FOR MANUFACTURING SEMICONDUCTOR DEVICE USING THE SAME

(71) Applicant: SAMSUNG ELECTRONICS CO., LTD., Suwon-si (KR)

(72) Inventor: Sungwe Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/638,199

(22) Filed: Apr. 17, 2024

(65) Prior Publication Data

US 2024/0265184 A1    Aug. 8, 2024

Related U.S. Application Data

(62) Division of application No. 17/517,126, filed on Nov. 2, 2021, now Pat. No. 11,989,497.

(30) Foreign Application Priority Data

Jan. 21, 2021 (KR) ........................ 10-2021-0008813

(51) Int. Cl.
G06F 30/392   (2020.01)
G06F 30/398   (2020.01)
H10D 89/10    (2025.01)
G06F 111/04   (2020.01)

(52) U.S. Cl.
CPC ........... *G06F 30/392* (2020.01); *G06F 30/398* (2020.01); *H10D 89/10* (2025.01); *G06F 2111/04* (2020.01)

(58) Field of Classification Search
CPC .. G06F 30/392; G06F 30/398; G06F 2111/04; G06F 2111/20; H01L 27/0207; H01L 21/823431; H01L 29/0673; H01L 29/42392; H01L 29/66439; H01L 29/775;
(Continued)

(56) References Cited

U.S. PATENT DOCUMENTS 6,410,972 B1   6/2002  Sei et al.
7,302,660 B2  11/2007  Shimamura
10,275,559 B2  4/2019  Wang et al.
(Continued)

FOREIGN PATENT DOCUMENTS

KR   20190087752 A    7/2019
KR   10-2020-0002001 A    1/2020

*Primary Examiner* — Paul Dinh
(74) *Attorney, Agent, or Firm* — Wolf, Greenfield & Sacks, P.C.

(57) ABSTRACT

A method of designing a layout of a semiconductor device, includes: preparing a standard cell library including information on standard cells; determining a layout of a common pattern region in consideration of a local layout effect based on the standard cell library; adding the common pattern region having a cell height that is identical to a cell height of each of the standard cells to opposite sides of one or more of the standard cells; and arranging the standard cells to share the common pattern region between at least one pair of adjacent ones of the standard cells.

6 Claims, 12 Drawing Sheets

(58) Field of Classification Search
CPC ........... H01L 29/78696; H01L 21/0274; H01L 27/088; H01L 29/785; B82Y 10/00
USPC ........................................................ 716/122
See application file for complete search history.

(56) References Cited

U.S. PATENT DOCUMENTS

| | | |
|---|---|---|
| 10,522,528 B2 | 12/2019 | Liaw |
| 2009/0193367 A1* | 7/2009 | Deppe ..................... G03F 1/44 716/100 |
| 2009/0300569 A1* | 12/2009 | Frenkil ............... H01L 27/0207 716/122 |
| 2018/0083036 A1 | 3/2018 | Agarwal et al. |
| 2018/0210421 A1 | 7/2018 | Kim et al. |
| 2019/0148407 A1 | 5/2019 | Guo et al. |
| 2019/0214377 A1 | 7/2019 | Ryu et al. |
| 2020/0050728 A1* | 2/2020 | Kim ..................... G06F 30/392 |
| 2020/0051977 A1* | 2/2020 | Lim ..................... H01L 23/535 |
| 2020/0119048 A1 | 4/2020 | Guo et al. |
| 2023/0097189 A1 | 3/2023 | Chen et al. |
| 2023/0306175 A1 | 9/2023 | Guo et al. |

\* cited by examiner

METHODS OF DESIGNING LAYOUT OF SEMICONDUCTOR DEVICE AND METHODS FOR MANUFACTURING SEMICONDUCTOR DEVICE USING THE SAME

CROSS-REFERENCE TO RELATED APPLICATIONS

This application is a divisional of U.S. patent application Ser. No. 17/517,126 that was filed on Nov. 2, 2021, and issued as U.S. Pat. No. 11,989,497 on May 21, 2024. U.S. patent application Ser. No. 17/517,126 claims benefit of priority under 35 U.S.C. § 119 to Korean Patent Application No. 10-2021-0008813 filed on Jan. 21, 2021, in the Korean Intellectual Property Office, the disclosures of both of which is incorporated herein by reference in their entireties.

BACKGROUND

The present inventive concepts relate to methods of designing a layout of a semiconductor device and methods for manufacturing the semiconductor device using the same.

Standard cells may be used for designing a semiconductor device including an integrated circuit. The standard cells may be cells having a predetermined architecture, and may be stored in a cell library. When designing the semiconductor device, the standard cells may be extracted from the cell library and disposed in appropriate positions on a layout of the semiconductor device. In the case of generating a standard cell library of standard cells included in an integrated circuit of a semiconductor device in the process of designing a semiconductor device, and implementing the integrated circuit using the generated standard cell library, a period of time and costs utilized for the design and implementation may be reduced.

SUMMARY

Aspects of the present inventive concepts may provide methods of designing a layout of a semiconductor device having improved integration and reliability, and methods for manufacturing a semiconductor device using the same.

According to an aspect of the present inventive concepts, a method of designing a layout of a semiconductor device, includes preparing a standard cell library including information on standard cells; determining a common active pattern in consideration of a local layout effect based on the standard cell library; adding a common pattern region, including the common active pattern, to opposite sides of the standard cells, respectively; and arranging the standard cells having the common pattern region, wherein, the standard cells comprise a first standard cell and a second standard cell that are disposed adjacent to each other, wherein, in the arranging the standard cells, responsive to a width of the common active pattern being identical to a width of active patterns in the first and second standard cells, the common pattern region is arranged to overlap the first and second standard cells, and, responsive to the width of the common active pattern being different from the width of the active patterns in at least one of the first standard cell or the second standard cell, the common pattern region is arranged to be shared between the first and second standard cells.

According to an aspect of the present inventive concepts, a method of designing a layout of a semiconductor device, includes preparing a standard cell library including information on standard cells; determining a layout of a common pattern region in consideration of a local layout effect based on the standard cell library; adding the common pattern region having a cell height that is identical to a cell height of each of the standard cells to opposite sides of one or more of the standard cells; and arranging the standard cells to share the common pattern region between at least one pair of adjacent ones of the standard cells.

According to an aspect of the present inventive concepts, a method for manufacturing a semiconductor device, includes designing a layout of the semiconductor device including layouts of standard cells; preparing a mask using the layout of the semiconductor device; and performing a photolithography process using the mask, wherein the designing the layout of the semiconductor device comprises: preparing a standard cell library including information on the standard cells; determining a common pattern to fix at least one of a plurality of cell characteristics in consideration of a local layout effect, based on the standard cell library; adding a common pattern region including the common pattern to opposite sides of the standard cells, respectively; and arranging the standard cells to overlap the common pattern region with the standard cells between a first plurality of adjacent ones of the standard cells, and to share the common pattern region between a second plurality of adjacent ones of the standard cells.

BRIEF DESCRIPTION OF DRAWINGS

The above and other aspects, features, and advantages of the present inventive concepts will be more clearly understood from the following detailed description, taken in conjunction with the accompanying drawings, in which.

DETAILED DESCRIPTION

Hereinafter, example embodiments of the present inventive concepts will be described with reference to the accompanying drawings.

Figure 1:
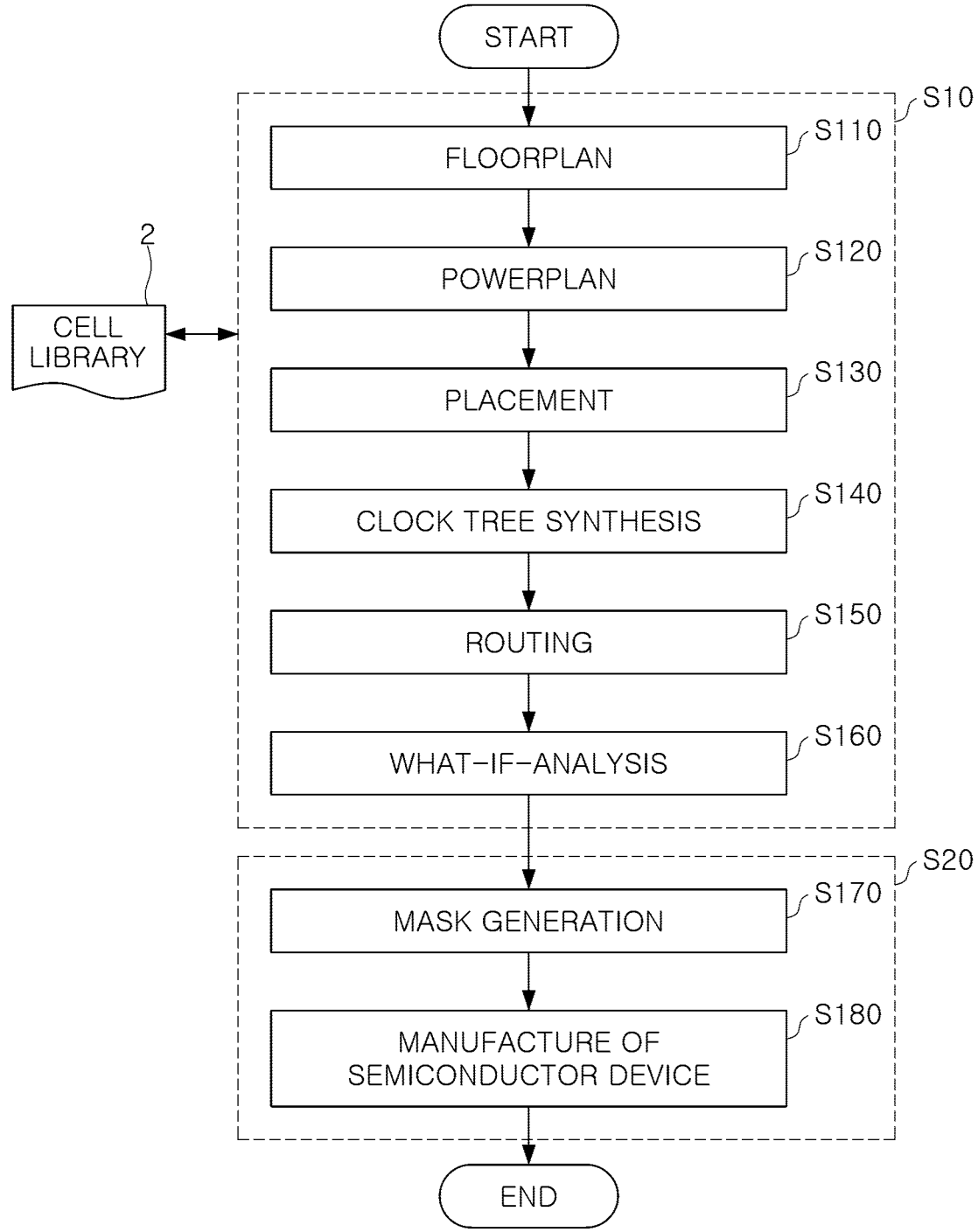
FIG. 1 is a flowchart illustrating a method of designing and manufacturing a semiconductor device according to example embodiments of the inventive concepts.

FIG. 1 is a flowchart illustrating a method of designing and manufacturing a semiconductor device according to example embodiments of the inventive concepts.

Referring to FIG. 1, a method of designing and manufacturing a semiconductor device may include designing S10 and manufacturing S20 the semiconductor device. The designing S10 of the semiconductor device may be an operation of designing a layout for an integrated circuit, and may be performed by a design system 1 described below with reference to FIG. 2. The design system 1 may include a program including a plurality of instructions executed by a processor. Therefore, the designing S10 of the semiconductor device may be a computer implemented operation for designing a circuit. The manufacturing S20 of the semiconductor device may be an operation of manufacturing the semiconductor device based on the designed layout, and may be performed in a semiconductor process module.

The designing S10 of the semiconductor device may include a floorplan S110, a powerplan S120, a placement S130, a clock tree synthesis (CTS) S140, a routing S150, and a what-if-analysis S160. At least a portion of the operations in the designing S10 of the semiconductor device may be performed, based on standard cells of a standard cell library 2.

The floorplan S110 may be an operation of physically designing a logically designed schematic circuit by cutting and moving the same. In the floorplan S110, a memory or circuit functional block may be arranged. In this operation, for example, circuit functional blocks to be disposed adjacent to each other may be identified, and spaces for the circuit functional blocks may be allocated in consideration of an available space, required performance, or the like. For example, the floorplan S110 may include generating a site-row and forming a routing track on the generated site-row. The site-low may be a frame for arranging the standard cells stored in the standard cell library 2 according to a prescribed design rule. The routing track may provide a virtual line on which interconnections are formed later. The interconnections may be arranged in the routing tracks in the routing S150.

The powerplan S120 may be an operation of arranging patterns of interconnections connecting a local power source, for example, a driving voltage or a ground, to the arranged circuit functional blocks. For example, patterns of interconnections connecting a power source or a ground may be generated such that the power source is evenly supplied to a chip in a net form. In this operation, the patterns may be generated in a net form through various rules.

The placement S130 may be an operation of arranging patterns of elements constituting the circuit functional block, and may include arranging the standard cells from the standard cell library 2. In particular, in example embodiments, each of the standard cells may have a common pattern region on both sides, and in this operation, between adjacent standard cells, the common pattern region may be disposed to overlap the standard cells, or may be disposed to be shared between the standard cells. This will be described in more detail below with reference to FIGS. 3A and 3B. Blank regions may occur between the standard cells arranged in this operation, and the blank regions may be filled by filler cells. Unlike standard cells including a semiconductor device to be operable, a unit circuit implemented by semiconductor devices, and the like, the filler cells may be dummy regions. By this operation, a shape or a size of a transistor to be actually formed on a silicon substrate, and a shape or size of a pattern for configuring interconnections may be defined. For example, in order to actually form an inverter circuit on a silicon substrate, layout patterns such as PMOS, NMOS, N-WELL, gate electrodes, and interconnections to be disposed thereon may be appropriately arranged.

The CTS S140 may be an operation of generating patterns of signal lines of a center clock related to a response time determining performance of the semiconductor device.

The routing S150 may be an operation of generating an interconnection structure connecting the arranged standard cells. The interconnection structure may be electrically connected to the interconnections in the standard cells, and may electrically connect the standard cells to each other.

The what-if-analysis S160 may be an operation of verifying and correcting a generated layout. Items to be verified may include a design-rule-check (DRC) verifying whether a layout has been properly made according to the design rules, an electrical-rule-check (ERC) verifying whether a layout has been properly made without electrical disconnection, a layout-vs-schematic (LVS) checking whether a layout matches the gate-level net list, and the like.

The manufacturing S20 of the semiconductor device may include a mask generation S170 and a manufacture of the semiconductor device S180.

The mask generation S170 may include performing optical-proximity-correction (OPC) on layout data generated in the designing S10, to generate mask data for forming various patterns on a plurality of layers, and manufacturing a mask using the mask data. The optical proximity correction may be for correcting a distortion phenomenon that may occur in a photolithography process. The mask may be manufactured in a manner depicting layout patterns using a chromium thin film applied on a glass or quartz substrate.

In the manufacture of the semiconductor device S180, various types of exposure and etching processes may be repeatedly performed. By these processes, patterns formed during layout design may be sequentially formed on a silicon substrate. Specifically, a semiconductor device in which an integrated circuit is implemented may be formed by performing various semiconductor processes on a semiconductor substrate such as a wafer using a plurality of masks. The semiconductor processes may include a deposition process, an etching process, an ion process, a cleaning process, and the like. In addition, the semiconductor process may include a packaging process of mounting a semiconductor device on a PCB and sealing the same with a sealing material, or a testing process for the semiconductor device or its package.

Figure 2:
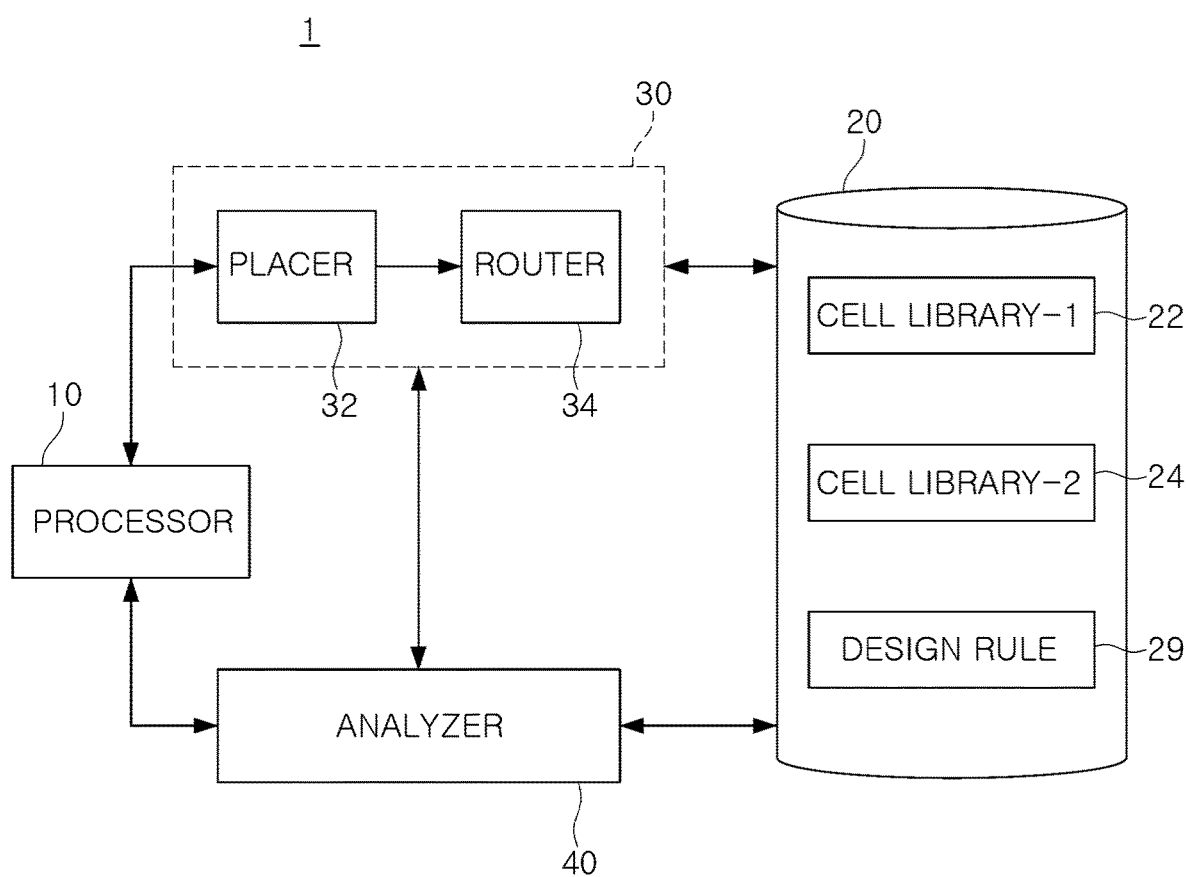
FIG. 2 is a block diagram illustrating a system for designing a semiconductor device according to example embodiments of the inventive concepts.

FIG. 2 is a block diagram illustrating a system for designing a semiconductor device according to example embodiments of the inventive concepts.

Referring to FIG. 2, a design system 1 may include a processor 10, a storage device 20, a design module 30, and an analyzer 40. The design system 1 may perform at least a portion of the design operation described in the designing S10 of the semiconductor device of FIG. 1. The design system 1 may be implemented as a device in which components are integrated, and thus may be referred to as a design device. The design system 1 may be provided as a dedicated device for designing an integrated circuit of a semiconductor device, and may be a computer for driving various simulation tools or design tools.

The processor 10 may be used such that the design module 30 and/or the analyzer 40 perform a logic operation. For example, the processor 10 may include a microprocessor, an application processor (AP), a digital signal processor (DSP), a graphic processing unit (GPU), and the like. In FIG. 2, the processor 10 is illustrated as a single processor, but according to some embodiments, the design system 1 may include a plurality of processors, and the processor 10 may include a cache memory to improve logic operation performance.

The storage device 20 may include one or more standard cell libraries 22 and 24, and may further include a design rule 29. The standard cell libraries 22 and 24 and the design rule 29 may be provided from the storage device 20 to the design module 30 and/or the analyzer 40. The standard cell libraries 22 and 24 may include standard cells having different cell heights, cell sizes, circuit specifications, circuit configurations, or widths of routing tracks, from each other. According to some embodiments, the number of standard cell libraries included in the storage device 20 may be variously changed.

The design module 30 may include a placer 32 and a router 34. Hereinafter, the term "module" may refer to software, hardware such as a field programmable gate array (FPGA) or an application specific integrated circuit (ASIC), or a combination of the software and the hardware. For example, the "module" may be stored in an addressable storage medium in the form of software, and may be configured to be executed by one or more processors. The placer 32 and the router 34 may perform the placement S130 and the routing S150 of FIG. 1, respectively. The placer 32 may use the processor 10 to arrange the standard cells, based on input data defining an integrated circuit and the standard cell libraries 22 and 24. In particular, the placer 32 may arrange the standard cells by a processing method of a shared pattern region, according to the present inventive concepts. The router 34 may perform signal routing for an arrangement of the standard cells provided from the placer 32. According to some embodiments, the placer 32 and the router 34 may be implemented as separate modules, respectively. In addition, the design module 30 may further include a configuration for performing the CTS S140 or the like of FIG. 1, in addition to the placer 32 and the router 34.

The analyzer 40, an analysis module, may perform the what-if-analysis S160 of FIG. 1, and may analyze and verify placement and routing results. When the routing is not successfully completed, the placer 32 may modify and provide the existing configuration and the router 34 may perform signal routing for the modified configuration again. When the routing is successfully completed, the router 34 may generate output data defining an integrated circuit.

The design module 30 and/or the analyzer 40 may be implemented in the form of software, but are not limited thereto. For example, when the design module 30 and the analyzer 40 are implemented in the form of software, the design module 30 and the analyzer 40 may be stored in the storage device 20 in the form of codes (e.g., computer instruction codes), or may be stored in the form of codes in another storage device, separate from the storage device 20.

Figure 3A:
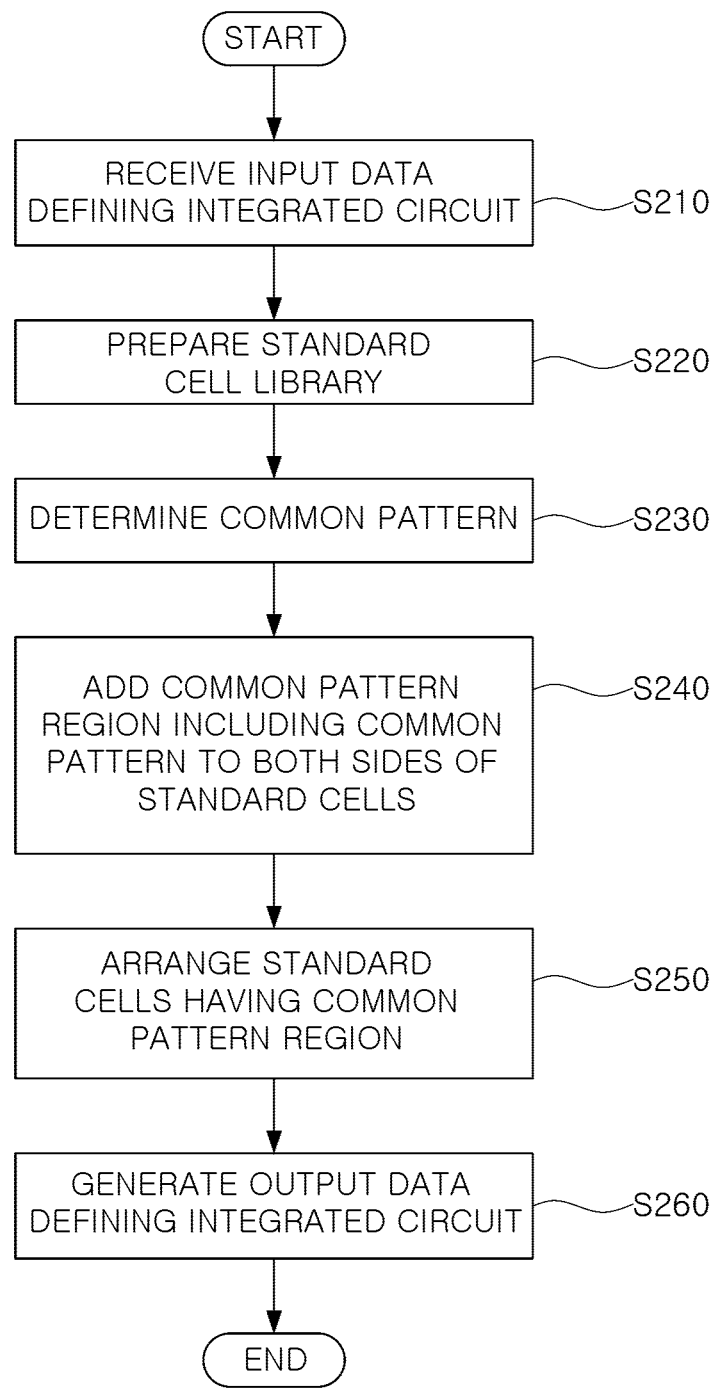
FIGS. 3A and 3B are block diagrams illustrating a method of designing a layout of a semiconductor device according to example embodiments of the inventive concepts.
Figure 3B:
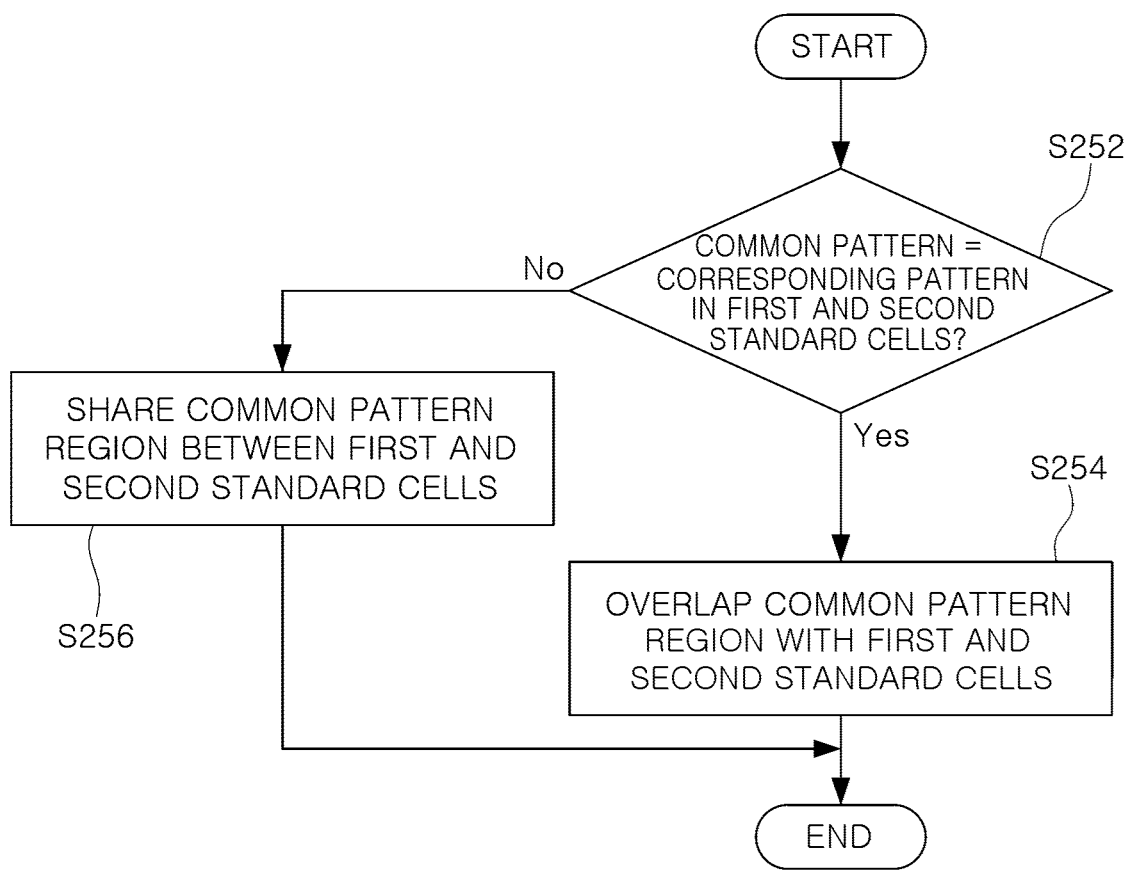

FIGS. 3A and 3B are block diagrams illustrating a method of designing a layout of a semiconductor device according to example embodiments of the inventive concepts.

Referring to FIG. 3A, a method of designing a layout of a semiconductor device may include receiving input data defining an integrated circuit of the semiconductor device S210, preparing a standard cell library S220, determining a common pattern S230, adding a common pattern region including the common pattern to both sides of standard cells S240, arranging the standard cells having the common pattern region S250, and generating output data defining the integrated circuit S260.

First, a step of receiving input data defining an integrated circuit S210 may be performed. The input data may include data related to behavior of the integrated circuit and/or data related to a layout.

In an embodiment, the input data may be data generated by synthesis using a standard cell library from data defined in an abstract form of an operation of the integrated circuit, for example, a register transfer level (RTL). For example, the input data may be a bitstream or a netlist generated by synthesizing an integrated circuit defined in a hardware description language (HDL) such as Very High-Speed Integrated Circuit (VHSIC) hardware description language (VHDL) and Verilog.

In another embodiment, the input data may be data defining a layout of the integrated circuit. For example, the input data may include geometric information defining a structure implemented as a semiconductor material, a metal, an insulator, or the like. The layout of the integrated circuit indicated by the input data may include a layout of standard cells, and may include conductive lines connecting the standard cells to each other.

Next, a step of preparing a standard cell library S220 may be performed. Standard cell refers to a unit of the integrated circuit satisfying a predetermined rule for a layout size and having a predetermined function. The standard cell may include an input pin and an output pin, and may process a signal received through the input pin to output the signal through an output pin. For example, the standard cell may correspond to a basic cell such as AND, OR, NOR, inverter, and the like, a complex cell such as OAI (OR/AND/INVERTER), AOI (AND/OR/INVERTER), and the like, and storage elements such as master-slave flip-flops, latches, and the like.

The standard cell library may include information on standard cells. For example, the standard cell library may include a name of a standard cell, information on a function, timing information, power information, layout information, or the like. The standard cell library may be stored in a storage medium such as the storage device 20 of FIG. 2, and the standard cell library may be provided by accessing the storage.

A step of determining a common pattern S230 may be an operation of determining the common pattern disposed on at least one side of the standard cells in consideration of a local layout effect (LLE). The common pattern may be a dummy pattern added such that at least one of the characteristics of the standard cells is not affected by configurations of devices disposed around it. The common pattern may be a pattern commonly added to standard cells in the standard cell library in order to fix at least one of the characteristics of the standard cells. For example, the common pattern may be an active region pattern and/or a gate pattern. The common pattern may have a width, identical to or different from a width of a corresponding pattern in the standard cells. The common pattern may be disposed at the same pitch as the corresponding pattern in the standard cells.

The common pattern may be determined by analyzing a trend in which at least one of the characteristics or a performance of the standard cells changes according to arrangement of adjacent cells, and selecting a pattern forming one of the arrangement relations as the common pattern. Specifically, in the step of determining a common pattern S230, for each of cases in which various candidate patterns are arranged on both sides of the standard cells, analyzing performance of the standard cells, and determining one of the candidate patterns as the common pattern in consideration of target characteristics of the standard cells. The performance of the standard cells may be, for example, at least one of an operation speed, a threshold voltage, an amount of leakage current, and an amount of power consumption.

When the standard cell library 2 includes a plurality of cell libraries, the common pattern may be independently determined in each of the plurality of cell libraries. Therefore, standard cells in one cell library may have the same common pattern, and standard cells in another cell library may have the same or different common patterns.

A step of adding a common pattern region including the common pattern to both sides of standard cells S240 may be an operation of adding the common pattern region including the determined common pattern to both and/or opposite sides of the standard cells. For example, the common pattern region may be added to the left and right of the standard cells. In this case, the common pattern region may have a height that is identical to a height of the standard cells. By this operation, the standard cell library may be composed of standard cells having a common pattern region.

However, according to some embodiments, the common pattern region may be added to upper and lower sides of the standard cells. In this case, the common pattern region may have a width that is identical to a width of the standard cells. According to some embodiments, the common pattern region may be added to only one side of the standard cells, rather than both sides.

A step of arranging the standard cells having the common pattern region S250 may be an operation included in the placement S130 described above with reference to FIG. 1. In this operation, between adjacent standard cells, the common pattern region may be shared between the standard cells.

In some embodiments, between adjacent standard cells, the common pattern region may be shared between the standard cells or may be disposed to overlap the standard cells. For example, between some of the adjacent standard cells, the common pattern region may be absorbed into the standard cells, and may be disposed to overlap the standard cells. In some embodiments, when the common pattern region overlaps and/or is absorbed in a standard cell, the active pattern of the common pattern region and the active pattern of standard cell may be formed of a same active pattern. In this case, adjacent standard cells may be arranged to directly contact each other. In addition, it may be arranged such that one common pattern region may be shared between some of the adjacent standard cells. In this case, the common pattern regions may overlap each other between adjacent standard cells, such that one common pattern region may be disposed to be interposed between the standard cells.

Referring to FIG. 3B, an example arrangement method when the standard cells include a first standard cell and a second standard cell, disposed adjacent to each other, will be described in detail. A step of arranging the standard cells having the common pattern region S250 may include determining whether the common pattern of the common pattern region is identical to a corresponding pattern in both the first and second standard cells S252. In this case, the identity may be determined in consideration of a position, a size, or the like of a pattern.

When the common pattern of the common pattern region is identical to the corresponding pattern in both the first and second standard cells, the common pattern region may be disposed to overlap the first and second standard cells S254. For example, the common pattern region on a right side of the first standard cell may be disposed to overlap the second standard cell, and the common pattern region on a left side of the second standard cell may be disposed to overlap the first standard cell.

When the common pattern of the common pattern region is different from the corresponding pattern in at least one of the first and second standard cells, the common pattern region may be disposed to be shared between the first and second standard cells S256. In this case, the common pattern region on the right side of the first standard cell and the common pattern region on the left side of the second standard cell overlap one another, such that only one common pattern region may be disposed between the first and second standard cells.

Referring again to FIG. 3A, in the step of generating output data defining the integrated circuit S260, the output data defining the integrated circuit may be generated. For example, when received input data is data such as a bitstream or a netlist generated by synthesizing the integrated circuit, output data may be the bitstream or the netlist. When received input data is, for example, data defining a layout of an integrated circuit having a graphic data system II (GDSII) format, a format of output data may also be data defining the layout of the integrated circuit. In some embodiments, output data may have a format including external information relating to a standard cell such as a pin of a standard cell, such as a layout exchange format (LEF) format or a milky-way format.

Figure 4A:
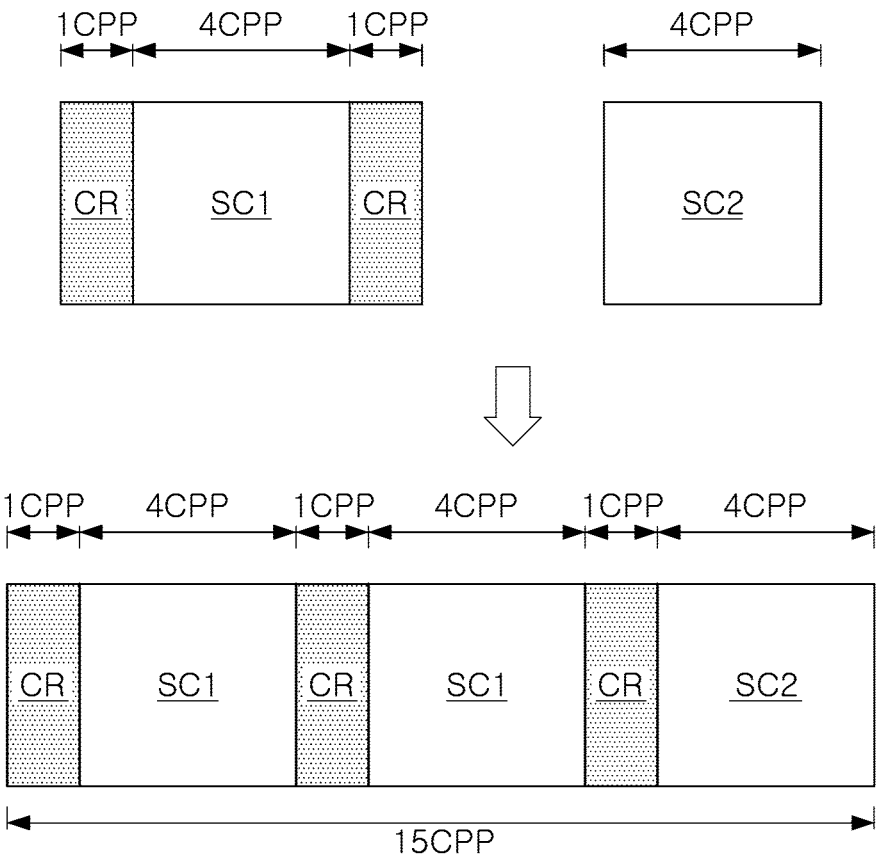
FIG. 4A is a view illustrating a method of designing a layout of a semiconductor device according to example embodiments of the inventive concepts.
Figure 4B:
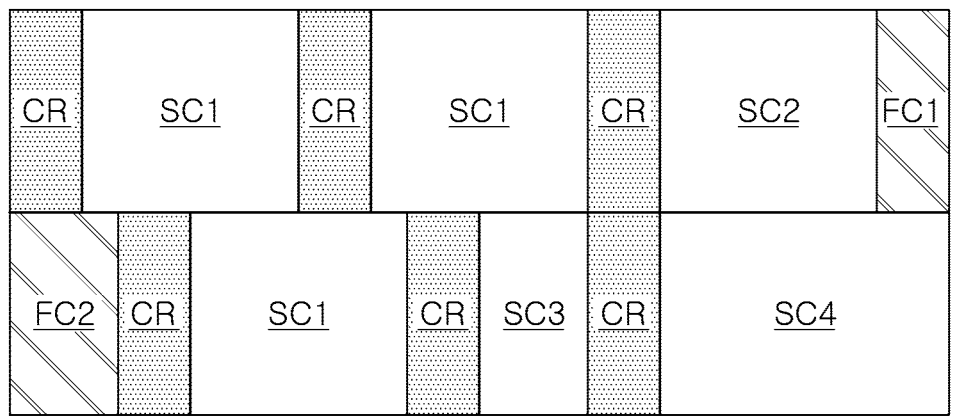
FIG. 4B is a layout diagram of a semiconductor device according to example embodiments of the inventive concepts.

FIG. 4A is a view illustrating a method of designing a layout of a semiconductor device according to example embodiments of the inventive concepts, and FIG. 4B is a layout diagram of a semiconductor device according to example embodiments of the inventive concepts.

Referring to FIG. 4A, in a standard cell library, a common pattern region CR may be added onto left and right sides of a first standard cell SC1, respectively. In this embodiment, the common pattern region CR may not be added to a second standard cell SC2, but is not limited thereto. The first and second standard cells SC1 and SC2 may have a width of 4 CPP (4 contacted poly pitch), respectively, and the common pattern region CR may have a cell height that is identical to a cell height of the first and second standard cells SC1 and SC2, and may have a width that is narrower than a width of the first and second standard cells SC1 and SC2, for example, 1 CPP. For example, 1 CPP may correspond to a pitch of a gate pattern GL (see FIG. 6B).

When the first and second standard cells SC1 and SC2 are arranged, a common pattern region CR may be shared between adjacent standard cells SC1 and/or SC2. Therefore, one common pattern region CR may be disposed between adjacent ones of the first standard cells SC1, and one common pattern region CR may be also disposed between the first standard cell SC1 and the second standard cell SC2. Therefore, as illustrated in the lower portion of FIG. 4A, when the first standard cell SC1, the first standard cell SC1, and the second standard cell SC2 are sequentially arranged, they may be disposed to have a width of 15 CPP in total. According to this embodiment, it can be seen that an arrangement area may be thus reduced, as compared to the arrangement with a width of 16 CPP in total, in which the common pattern region CR is not shared between the standard cells SC1 and SC2 such that two common pattern regions CR may be disposed between the first standard cells SC1.

Referring to FIG. 4B, a semiconductor device 100 may include first to fourth standard cells SC1, SC2, SC3, and SC4, and first and second filler cells FC1 and FC2, arranged in the manner of FIG. 4A. The first and third standard cells SC1 and SC3 may be standard cells to which the common pattern region CR is added, and the second and fourth standard cells SC2 and SC4 may be standard cells to which the common pattern region CR is not added.

Therefore, the common pattern region CR may be disposed to be shared between the first standard cells SC1, between the third standard cells SC3, and between the first standard cell SC1 and the third standard cell SC3. The common pattern region CR may be common within at least one circuit functional block, and may thus have a constant width within at least one circuit functional block. Circuit functional blocks refer to regions in the semiconductor device 100 that perform different circuit functions, and according to some embodiments, the circuit functional blocks may be disposed to be spaced apart from each other by an empty region.

The first and second filler cells FC1 and FC2 may be partially arranged on an outside of the common pattern region CR of the first and third standard cells SC1 and SC3 and an outside of the second and fourth standard cells SC2 and SC4. The first and second filler cells FC1 and FC2 may be regions in which dummy (e.g., non-functional) components or dummy semiconductor devices are disposed. Unlike the common pattern region CR, the first and second filler cells FC1 and FC2 may not have a constant width. In example embodiments, the first and second filler cells FC1 and FC2 may have different widths, and types and the number of filler cells may be variously changed.

Figure 5A:
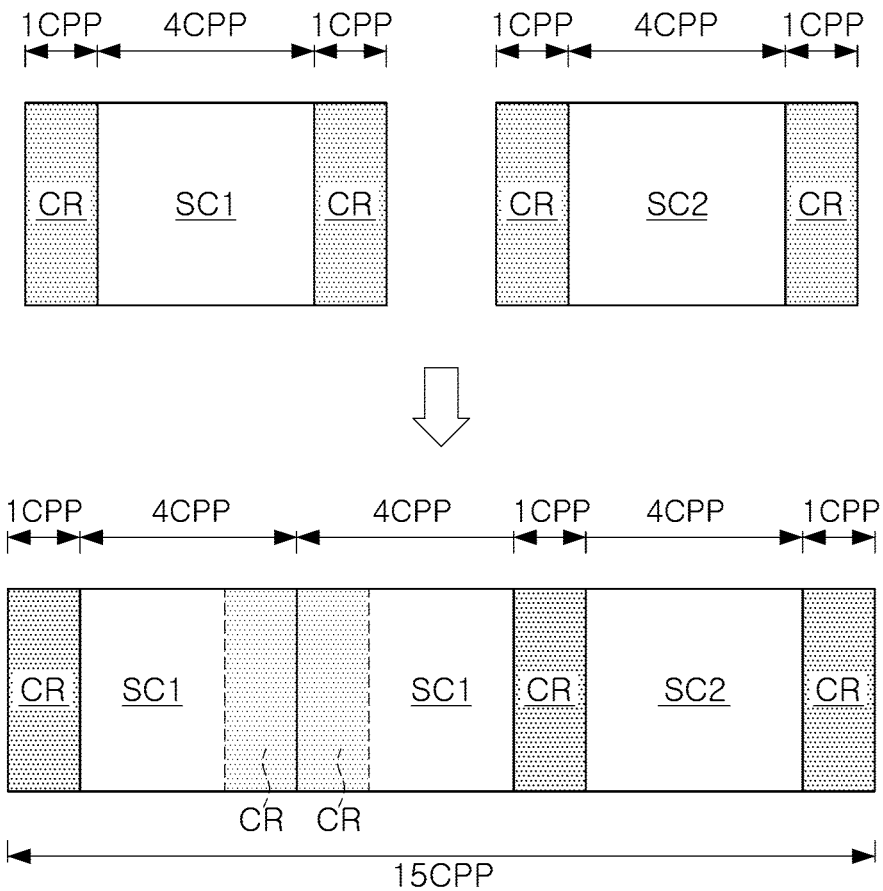
FIG. 5A is a view illustrating a method of designing a layout of a semiconductor device according to example embodiments of the inventive concepts.
Figure 5B:
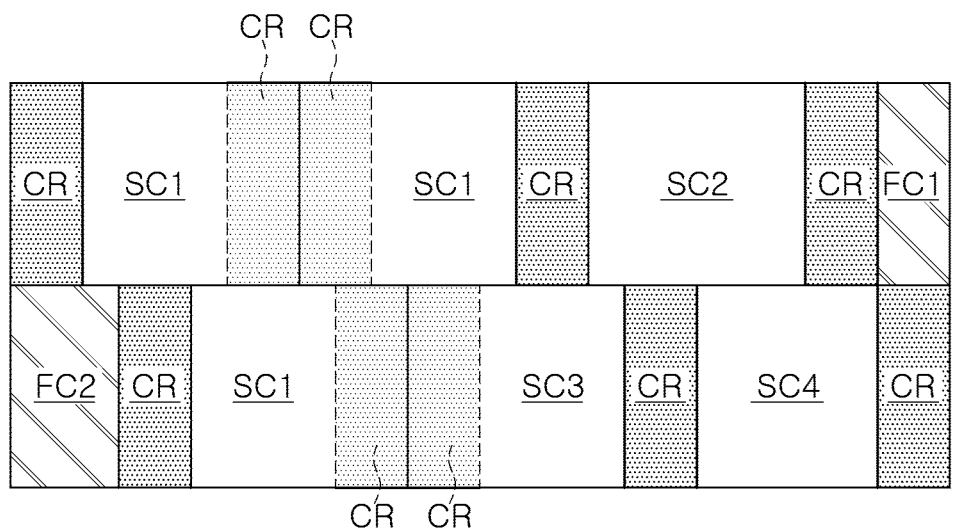
FIG. 5B is a layout diagram of a semiconductor device according to example embodiments of the inventive concepts.

FIG. 5A is a view illustrating a method of designing a layout of a semiconductor device according to example embodiments of the inventive concepts, and FIG. 5B is a layout diagram of a semiconductor device according to example embodiments of the inventive concepts.

Referring to FIG. 5A, in a standard cell library, a common pattern region CR may be added onto left and right (e.g., opposing) sides of first and second standard cells SC1 and SC2, respectively. The first and second standard cells SC1 and SC2 may have a width of 4 CPP, respectively, and the common pattern region CR may have a cell height that is identical to a cell height of the first and second standard cells SC1 and SC2, and may have a width that is narrower than a width of the first and second standard cells SC1 and SC2, for example, 1 CPP. Depending on the description, an entire portion including the first standard cell SC1 and the common pattern regions CR added onto the left and right (e.g., opposite) sides of the first standard cell SC1 may be referred to as one standard cell.

When the first and second standard cells SC1 and SC2 are arranged, a common pattern region CR may be shared or overlap between adjacent standard cells SC1 and SC2. For example, between the first standard cells SC1, the common pattern region CR may be absorbed into the first standard cells SC1 and disposed to overlap the first standard cells SC1. Between the first standard cell SC1 and the second standard cell SC2 and between the second standard cells SC2, a common pattern region CR may be shared such that one common pattern region CR may be disposed. Whether the common pattern region CR is shared or overlapped may be determined based on the identity of the pattern as described above with reference to FIG. 3B.

Therefore, as illustrated in a lower portion of FIG. 5A, when the first standard cell SC1, the first standard cell SC1, and the second standard cell SC2 are sequentially arranged, a width of 15 CPP in total may be disposed. According to this embodiment, it can be seen that a placement area may be reduced, as compared to the arrangement with a width of 16 CPP in total, in which the common pattern region CR is only shared, but not absorbed, between the first standard cells SC1.

Referring to FIG. 5B, a semiconductor device 100a may include first to fourth standard cells SC1, SC2, SC3, and SC4 and first and second filler cells FC1 and FC2, arranged in the manner of FIG. 5A. The first to fourth standard cells SC1, SC2, SC3, and SC4 may all be standard cells to which a common pattern regions CR are added.

Between the first standard cells SC1, between the third standard cells SC3, and between the first and third standard cells SC1 and SC3, the common pattern region CR may be disposed to overlap the first and third standard cells SC1 and SC3, respectively, and, on one side of the second and fourth standard cells SC2 and SC4, the common pattern region CR may be disposed to be shared with surrounding standard cells. The common pattern region CR may be common within at least one circuit functional block, and may thus have a constant width within the at least one circuit functional block.

The first and second filler cells FC1 and FC2 may be partially disposed outside the common pattern regions CR. Unlike the common pattern region CR, the first and second filler cells FC1 and FC2 may not have a constant width. In addition, the first and second filler cells FC1 and FC2 may not be disposed to directly contact the first to fourth standard cells SC1, SC2, SC3, and SC4, but may be disposed to contact the common pattern regions CR. In example embodiments, the first and second filler cells FC1 and FC2 may have different widths, and types and the number of filler cells may be variously changed.

As described above with reference to FIGS. 4A to 5B, according to some embodiments, the common pattern region CR may be added to opposite sides of at least some standard cells. According to some embodiments, the common pattern region CR may be shared between adjacent standard cells, or may be shared with or may overlap the standard cells. In embodiments of FIGS. 4B and 5B, cases in which standard cells of the semiconductor devices 100 and 100a have a constant cell height are illustrated, but the semiconductor devices 100 and 100a may also include standard cells having different cell heights.

Figure 6A:
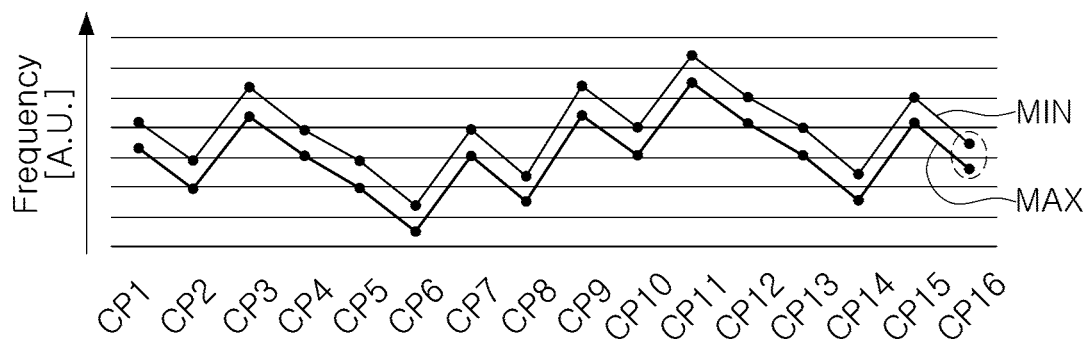
FIGS. 6A to 6C are views illustrating a method of designing a layout of a semiconductor device according to example embodiments of the inventive concepts.
Figure 6B:
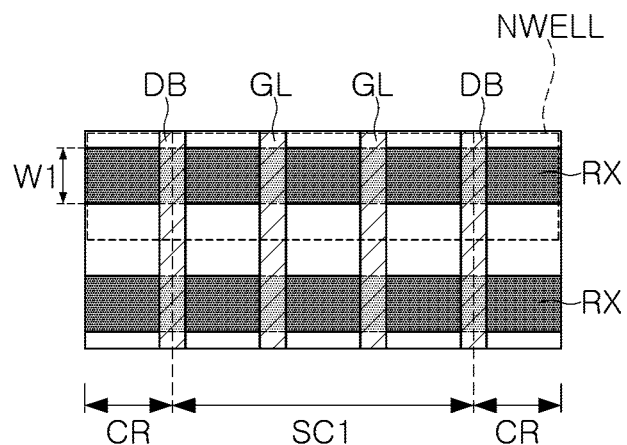
Figure 6B:
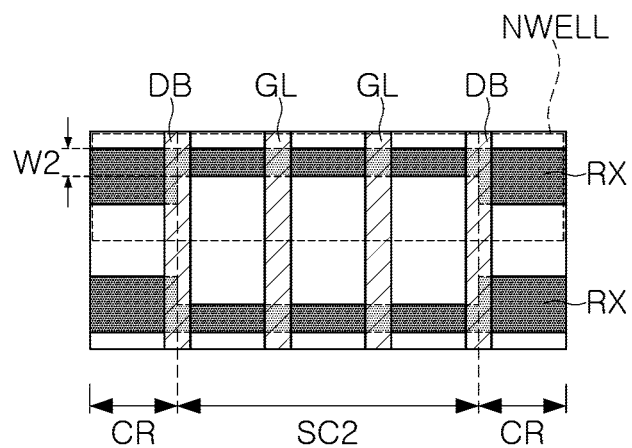
Figure 6C:
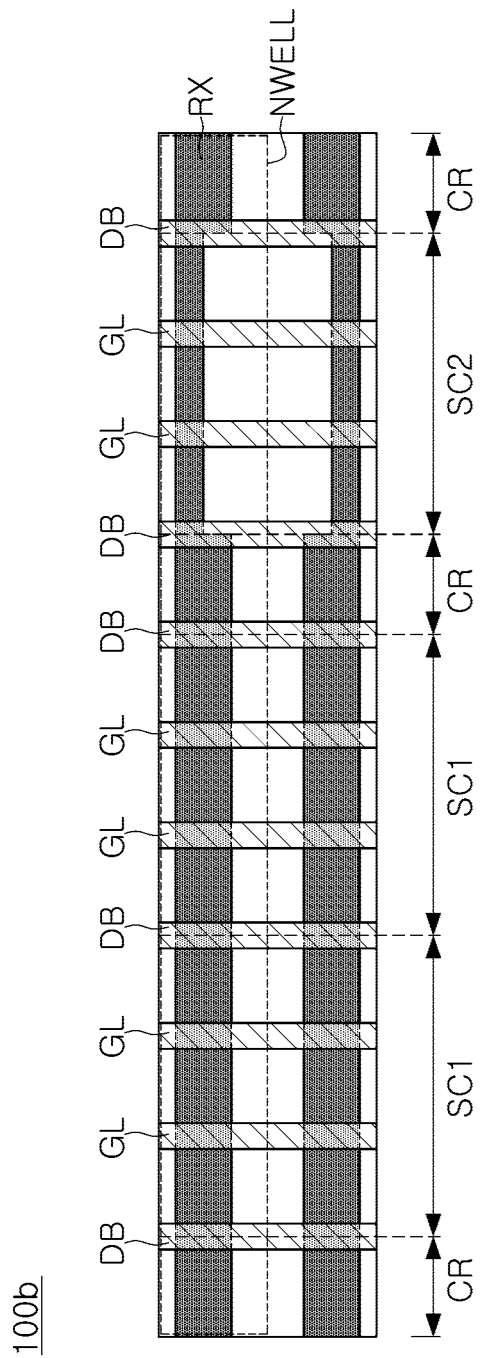

FIGS. 6A to 6C are views illustrating a method of designing a layout of a semiconductor device according to example embodiments of the inventive concepts.

Referring to FIG. 6A, an embodiment of determining a common pattern S230, described above with reference to FIG. 3A, will be described. For example, for a standard cell including an NFET and a PFET, a process of considering a local layout effect (LLE) will be described. In order to minimize the local layout effect (LLE), a dummy active pattern may be added as the common pattern to both sides of the standard cell. In order to determine a shape of the common pattern in this case, electrical properties may be simulated for candidate patterns to be applicable, as illustrated in FIG. 6A.

Specifically, considering a combination in which active patterns of a first width to have a 2-fin structure or active patterns of a second width to have a 1-fin structure are arranged, on left and right sides of each of the NFET and PFET, in the standard cell, pattern arrangement CP1 to CP16 may be a total of 16 cases. In this case, the second width may be narrower than the first width, and the NFET and PFET may be fixed and analyzed as a case having an active pattern having the first width.

FIG. 6A may be a result of simulation of cell characteristics such as an operation speed under a specific condition for each of the first to sixteenth pattern arrangements CP1 to CP16. Based on this result, one pattern arrangement type, for example, a 16$^{th}$ pattern arrangement type CP16 may be selected as a common pattern type. For example, the 16$^{th}$ pattern arrangement type CP16 may correspond to a case in which active regions of the first width may be disposed on both the left and right sides of the NFET and PFET. In this case, the difference between the maximum value and the minimum value of the operation speed may be the smallest, as compared to the pattern arrangement types in which the first width and the second width are mixed and applied. Therefore, the common pattern for the active region may be determined as the active pattern having the first width.

Referring to FIG. 6B, example layouts of first and second standard cells SC1 and SC2 to which a common pattern region CR including an active pattern determined according to the operations described with reference to FIG. 6A is added are illustrated.

The first standard cell SC1 may include an active pattern RX having a first width W1, and may further include a well pattern NWELL, a gate pattern GL, and a diffusion break pattern DB. The second standard cell SC2 may include an active pattern RX having a second width W2, narrower than the first width W1, and may further include well pattern NWELL, a gate pattern GL, and a diffusion break pattern DB. The first and second standard cells SC1 and SC2 may further include a pin pattern, a contact pattern, and a power line pattern.

The common pattern region CR may include a well pattern NWELL and an active pattern RX having a first width W1. In this embodiment, the common pattern region CR may not include a diffusion break pattern DB. However, in the common pattern region CR, the diffusion break pattern DB disposed at a boundary of each of the first and second standard cells SC1 and SC2 may be disposed in an overlapping form to the common pattern region CR.

According to some embodiments, the common pattern region CR may further include a gate pattern GL and/or a diffusion break pattern DB. In a case in which the common pattern region CR includes the diffusion break pattern DB, as described above with reference to FIG. 5A, when the common pattern region CR overlaps the first standard cells SC1, it may be designed to exclude the diffusion break pattern DB of the common pattern region CR overlapping the gate pattern GL.

The first and second standard cells SC1 and SC2 may have a form in which a common pattern region CR is added onto left and right sides in the same manner. Therefore, the active pattern RX in the first standard cell SC1 and the common pattern region CR on opposite sides thereof may extend in the same width as the first standard cell SC1. Since widths of the active patterns RX in the second standard cell SC2 and the common pattern regions CR on both sides thereof may be different from each other, a region of which width is changed may be formed.

Referring to FIG. 6C, a portion of a layout of a semiconductor device 100b in which the first and second standard cells SC1 and SC2 of FIG. 6B are in an order of a first standard cell SC1, a first standard cell SC1, and a second standard cell SC2 is illustrated.

Similarly to those described above with reference to FIG. 5B, a common pattern region CR may be absorbed by and overlap the first standard cells SC1 between the first standard cells SC1, and a common pattern region CR may be shared between the first standard cell SC1 and the second standard cell SC2. Therefore, in the layout of the semiconductor device 100b, active patterns RX having a first width W1 (refer to FIG. 6B) may be disposed around each of the first and second standard cells SC1 and SC2.

In the semiconductor device 100b, some of the first standard cells SC1 may have a dummy region corresponding to the common pattern region CR on the left or right side, and the other portion/side of the first standard cells SC1 may not have a dummy region. In addition, since the dummy region corresponds to the common pattern region CR in designing, a width may be constant within at least one circuit functional block.

Figure 7A:
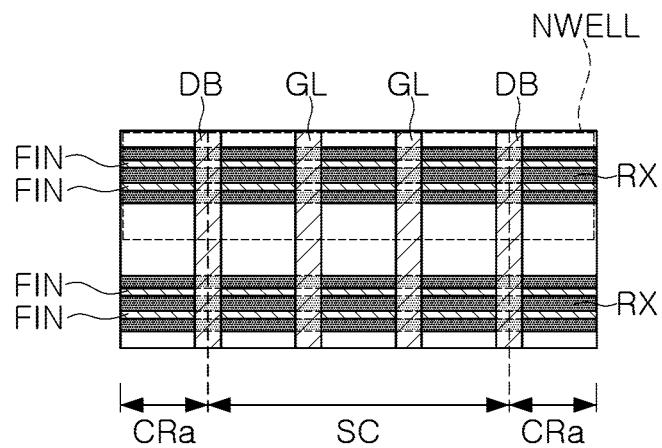
FIGS. 7A to 7C are layouts of a semiconductor device according to example embodiments of the inventive concepts.
Figure 7B:
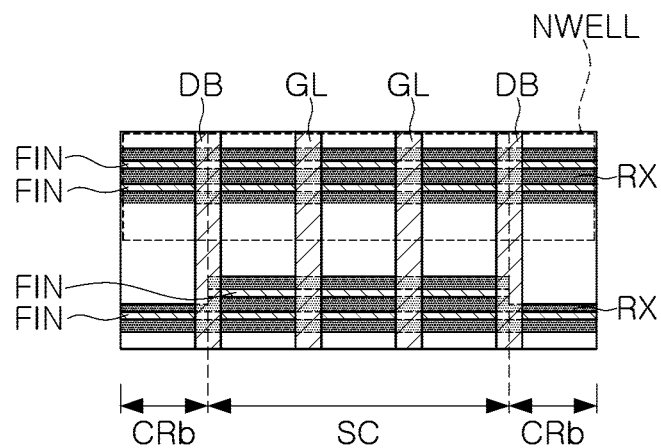
Figure 7C:
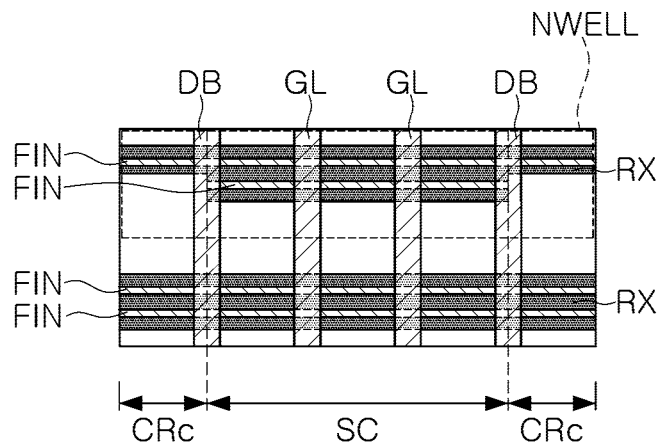

FIGS. 7A to 7C are layouts of a semiconductor device according to example embodiments of the inventive concepts.

Referring to FIG. 7A, in a standard cell SC, a common pattern region CRa on both and/or opposite sides of the standard cell SC may include a well pattern NWELL and an active pattern RX having a first width W1 (refer to FIG. 6B), as in the first and second standard cells SC1 and SC2 described above with reference to FIG. 6B. The common pattern region CRa may further include fin patterns FIN disposed to overlap the active pattern RX.

In this embodiment, the common pattern region CRa may be equally added to all standard cells including the standard cell SC illustrated. In this case as an example, as described above with reference to FIG. 6A, characteristics of the operation speed in all standard cells may be fixed to a range of characteristic values in the 16$^{th}$ pattern arrangement type CP16.

Referring to FIG. 7B, in a standard cell SC, common pattern regions CRb on both sides may include a well pattern NWELL, an active pattern RX, and fin patterns FIN disposed to overlap the active pattern RX. In the common pattern region CRb, the active pattern RX may have a first width W1 (refer to FIG. 6B) in a region overlapping the well pattern NWELL, and may have a second width W2 (refer to FIG. 6B) in a region not overlapping the well pattern NWELL. In the common pattern region CRb, two fin patterns FIN may be disposed in a region overlapping the active pattern RX in an upper portion (e.g., in a region overlapping the well pattern NWELL in FIG. 7B), and one fin pattern FIN may be disposed in a region overlapping the active pattern RX in a lower portion (e.g., in a region not overlapping the well pattern NWELL in FIG. 7B). For example, the PFET region may have a relatively larger active pattern RX as a shared pattern, as compared to the NFET region. A structure of the common pattern region CRb may correspond to, for example, the 11$^{th}$ pattern arrangement type CP11 in the graph of FIG. 6A.

In this embodiment, the common pattern region CRb may be equally added to all standard cells including the standard cell SC illustrated. In this case, as described above with reference to FIG. 6A, characteristics of the operation speed in all standard cells may be fixed to a range of characteristic values in the 11$^{th}$ pattern arrangement type CP11. Therefore, for example, the common pattern region CRb may be set such that an operation speed is specialized and a threshold voltage is lowered in standard cells.

Referring to FIG. 7C, in a standard cell SC, common pattern regions CRc on both sides may include a well pattern NWELL, an active pattern RX, and fin patterns FIN disposed to overlap the active pattern RX. In the common pattern region CRc, the active pattern RX may have a second width W2 (refer to FIG. 6B) in a region overlapping the well pattern NWELL, and may have a first width W1 (see FIG. 6B) in a region not overlapping the well pattern NWELL. In the common pattern region CRc, one fin pattern FIN may be disposed in a region overlapping the active pattern RX in an upper portion (e.g., in a region overlapping the well pattern NWELL in FIG. 7C), and two fin patterns FIN may be disposed in a region overlapping the active pattern RX in a lower portion (e.g., in a region not overlapping the well pattern NWELL in FIG. 7C). For example, the PFET region may have a relatively smaller active pattern RX as a shared pattern, as compared to the NFET region. A structure of the common pattern region CRc may correspond to, for example, the 6$^{th}$ pattern arrangement type CP6 in the graph of FIG. 6A.

In this embodiment, the common pattern region CRc may be equally added to all standard cells including the standard cell SC illustrated. In this case, as described above with reference to FIG. 6A, characteristics of the operation speed in all standard cells may be fixed to a range of characteristic values in the 6$^{th}$ pattern arrangement type CP6. Therefore, for example, the common pattern region CRc may be set such that a decrease in operating speed is tolerated and a threshold voltage increases to minimize leakage current in standard cells.

As described above with reference to FIGS. 7A to 7C, the common pattern regions CRa, CRb, and CRc may be variously determined according to characteristics of each circuit of a desired semiconductor device. Therefore, for example, in different standard cell libraries, the common pattern regions may be determined to be the same or different from each other.

Figure 8:
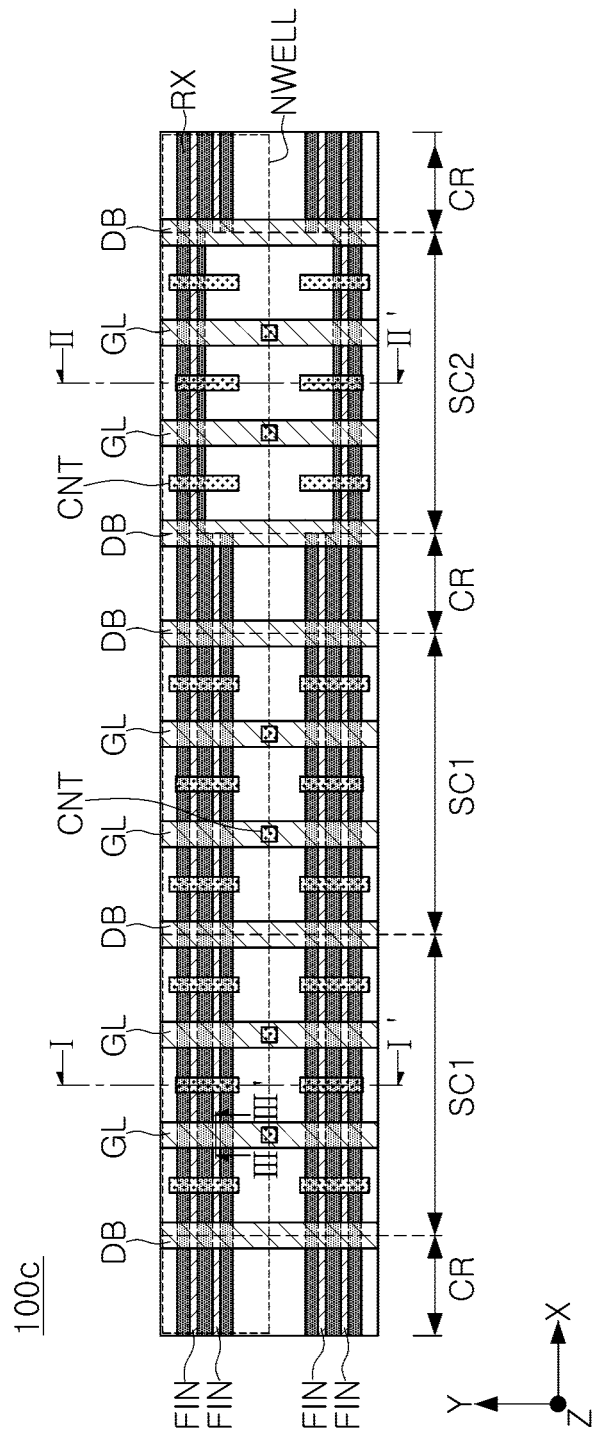
FIG. 8 is a layout of a semiconductor device according to example embodiments of the inventive concepts.

FIG. 8 is a layout of a semiconductor device according to example embodiments. For convenience of explanation, only a layout of some components of a semiconductor device is illustrated in FIG. 8.

Referring to FIG. 8, a semiconductor device 100c is illustrated together with fin patterns FIN and contact patterns CNT, in addition to the layout of FIG. 6C. First and second standard cells SC1 and SC2 may include well patterns NWELL defining well regions such as N-well regions, a pair of active patterns RX extending in an X direction, fin patterns FIN overlapping the active pattern RX and extending in the X direction, gate patterns GL extending in a Y direction, and contact patterns CNT connected to the active patterns RX and the gate patterns GL, respectively. Although not illustrated, the first and second standard cells SC1 and SC2 may further include power interconnection line patterns extending in the X direction along upper and lower cell boundaries, and connected to the contact patterns CNT, e.g., through a via.

The active patterns RX may be disposed in well regions of different conductivity types and may be connected to contact patterns CNT in an upper portion. In FIG. 8, active patterns RX disposed in the well patterns NWELL have an N-type conductivity type, and active patterns RX not disposed in the well patterns NWELL have a P-type conductivity type.

The gate patterns GL may include a gate electrode and a dummy gate electrode, and may intersect the active patterns RX. In example embodiments, the gate patterns GL may have different widths in the first and second standard cells SC1 and SC2 in the X direction.

The contact patterns CNT may be connected to the active patterns RX and the gate patterns GL.

As illustrated in FIG. 8, common pattern regions CR may be arranged between the first standard cells SC1 and/or the second standard cells SC2. For example, between the first standard cells SC1, the common pattern region CR may be absorbed into the first standard cells SC1 and disposed to overlap (e.g., vertically overlap in the Z direction of FIG. 8) the first standard cells SC1. Between the first standard cell SC1 and the second standard cell SC2, a common pattern region CR may be shared such that one common pattern region CR may be disposed between (e.g., in X direction of FIG. 8) the first standard cell SC1 and the second standard cell SC2.

Figure 9A:
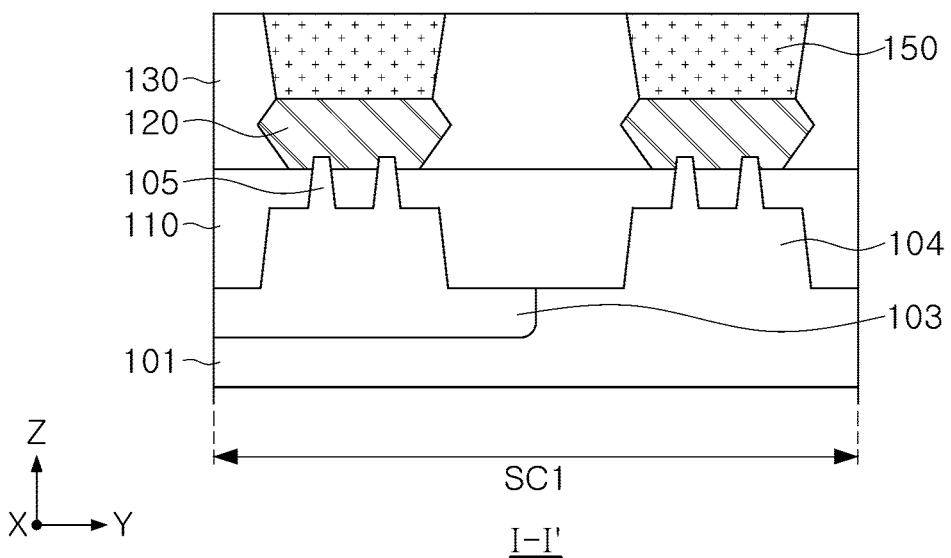
FIGS. 9A to 9C are cross-sectional views illustrating a semiconductor device according to example embodiments of the inventive concepts.
Figure 9B:
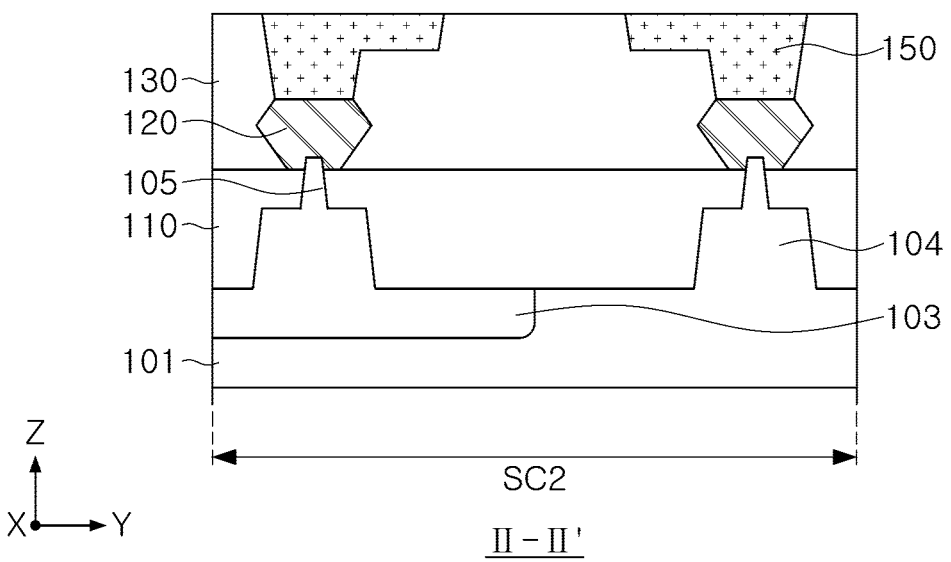
Figure 9C:
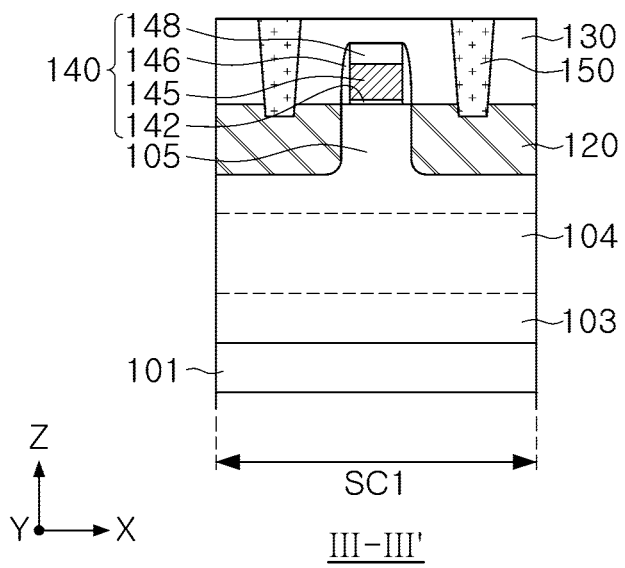

FIGS. 9A to 9C are cross-sectional views illustrating a semiconductor device according to example embodiments. FIGS. 9A to 9C illustrate cross-sections of the semiconductor device of FIG. 8, taken along cutting lines I-I', II-II', and III-III' of FIG. 8, respectively.

Referring to FIGS. 9A to 9C, a semiconductor device 100c may include a substrate 101, active regions 104 including active fins 105, a device isolation layer 110, source/drain regions 120, gate structures 140 including a gate electrode layer 145, an interlayer insulating layer 130, and contacts 150. In FIGS. 9A to 9C, the active regions 104 may be disposed to correspond to the active patterns RX of FIG. 8, the active fins 105 may be disposed to correspond to the fin patterns FIN of FIG. 8, the gate structures 140 may be disposed to correspond to the gate patterns GL of FIG. 8, and the contacts 150 may be disposed to correspond to the contact patterns CNT of FIG. 8. The semiconductor device 100c may include FinFET devices, which may be transistors including the active fins 105 having a fin structure.

The substrate 101 may have an upper surface extending in the X and Y directions. The substrate 101 may include a semiconductor material, such as a group IV semiconductor, a group III-V compound semiconductor, or a group II-VI compound semiconductor. For example, the group IV semiconductor may include silicon, germanium, or silicon-germanium. The substrate 101 may be provided as a bulk wafer, an epitaxial layer, a silicon-on-insulator (SOI) layer, or a semiconductor-on-insulator (SeOI) layer. The substrate 101 may include doped regions such as an N-well region 103.

The device isolation layer 110 may define the active regions 104 in the substrate 101. The device isolation layer 110 may be formed by, for example, a shallow trench isolation (STI) process. The device isolation layer 110 may include a region extending deeper below the substrate 101 between adjacent active regions 104, but is not limited thereto. According to some embodiments, the device isolation layer 110 may have a curved upper surface having a higher level, as the device isolation layer 110 is closer to the active fins 105. The device isolation layer 110 may be formed of an insulating material, and may include, for example, an oxide, a nitride, or a combination thereof.

The active regions 104 may be defined by the device isolation layer 110 in the substrate 101, and may be disposed to extend in a first direction, for example, in the X direction. The active fins 105 may have a shape protruding from the substrate 101. Upper ends of the active fins 105 may be disposed to protrude from an upper surface of the device isolation layer 110 to a predetermined height. The active fins 105 may be formed with a portion of the substrate 101, or may include an epitaxial layer grown from the substrate 101. In a region not illustrated, the active regions 104 may be cut by a diffusion break pattern DB of FIG. 8.

The active fins 105 may be partially recessed on both sides of the gate structures 140, and source/drain regions 120 may be disposed on the recessed regions of the active fins 105. According to some embodiments, the active regions 104 may have doped regions including impurities. For example, the active fins 105 may include impurities diffused from the source/drain regions 120 in a region contacting the source/drain regions 120. In example embodiments, the active fins 105 may be omitted, and in this case, the active regions 104 may have a structure having a planar upper surface.

The source/drain regions 120 may be disposed on both sides of the gate structures 140 and on the recessed regions in which the active fins 105 are recessed. The source/drain regions 120 may be provided as a source region or a drain region of transistors. Upper surfaces of the source/drain regions 120 may be located on the same or a similar height level as lower surfaces of the gate structures 140 in a cross-section of FIG. 9C in the X direction. Relative heights of the source/drain regions 120 and the gate structures 140 may be variously changed, according to some embodiments.

The source/drain regions 120 may have a merged shape connected to each other between adjacent active fins 105 in the Y direction, as illustrated in FIG. 9A, but are not limited thereto. The source/drain regions 120 may have lateral surfaces having angular shapes in a cross-section of FIG. 9A in the Y direction. In embodiments, the source/drain regions 120 may have various shapes, and for example, may have any one of a polygon, a circle, an ellipse, and a rectangle. Also, for example, the source/drain regions 120 may have different shapes in a PFET region and an NFET region.

The source/drain regions 120 may be formed of an epitaxial layer, and may include, for example, silicon (Si), silicon germanium (SiGe), or silicon carbide (SiC). Also, the source/drain regions 120 may further include impurities such as arsenic (As) and/or phosphorus (P). In example embodiments, the source/drain regions 120 may include a plurality of regions including elements of different concentrations and/or doping elements.

The gate structures 140 may be disposed on the active regions 104 to intersect the active regions 104 and extend in one direction, for example, in the Y direction. Channel regions of transistors may be formed in the active fins 105 intersecting the gate structures 140. The gate structure 140 may include a gate insulating layer 142, a gate electrode layer 145, gate spacer layers 146, and a gate capping layer 148. According to some embodiments, the gate structures 140 may have different widths in the X direction, in the first standard cells SC1 and the second standard cells SC2.

The gate insulating layer 142 may be disposed between the active fin 105 and the gate electrode layer 145. In example embodiments, the gate insulating layer 142 may be formed as a plurality of layers, or may be disposed to extend onto a lateral surface of the gate electrode layer 145. The gate insulating layer 142 may include an oxide, a nitride, or a high-k material. The high-k material may refer to a dielectric material having a dielectric constant higher than that of a silicon oxide film ($SiO_2$).

The gate electrode layer 145 may include a conductive material, for example, a metal nitride such as a titanium nitride film (TiN), a tantalum nitride film (TaN), a tungsten nitride film (WN), or the like, and/or a metal material such as aluminum (Al), tungsten (W), molybdenum (Mo), or the like, or a semiconductor material such as doped polysilicon or the like. The gate electrode layer 145 may be formed as two or more multiple layers. The gate electrode layers 145 may be disposed to be separated from each other in the Y direction, between at least some adjacent transistors according to a circuit configuration of the semiconductor device 100c. For example, the gate electrode layer 145 may be separated by a separate gate separation layer.

The gate spacer layers 146 may be disposed on both sides of the gate electrode layer 145. The gate spacer layers 146 may insulate the source/drain regions 120 from the gate electrode layer 145. The gate spacer layers 146 may have a multilayer structure according to some embodiments. The gate spacer layers 146 may be formed, for example, of an oxide, a nitride, and/or an oxynitride, and in particular, may be formed of a low-k film. The gate spacer layers 146 may include, for example, at least one of SiO, SiN, SiCN, SiOC, SiON, or SiOCN.

The gate capping layer 148 may be disposed on the gate electrode layer 145, and a lower surface and lateral surfaces thereof may be surrounded by the gate electrode layer 145 and the gate spacer layers 146, respectively. The gate capping layer 148 may be formed of, for example, an oxide, a nitride, or an oxynitride.

The interlayer insulating layer 130 may be disposed to cover the source/drain regions 120 and the gate structures 140. The interlayer insulating layer 130 may include, for example, at least one of an oxide, a nitride, or an oxynitride, and may include a low-k material.

The contacts 150 may pass through the interlayer insulating layer 130 to be connected to the source/drain regions 120, or may pass through the interlayer insulating layer 130 and the gate capping layer 148 to be connected to the gate electrode layer 145, and may apply an electric signal to the source/drain regions 120 and the gate electrode layer 145. The contacts 150 may be disposed to recess the source/drain regions 120 to a predetermined depth, but are not limited thereto. The contacts 150 may include a conductive material, for example, a metal material such as tungsten (W), aluminum (Al), copper (Cu), or the like, or a semiconductor material such as doped polysilicon or the like. According to some embodiments, the contacts 150 may include a barrier metal layer disposed along an outer surface. In addition, according to some embodiments, the contacts 150 may further include a metal-semiconductor layer such as a silicide layer or the like disposed at an interface contacting the source/drain regions 120 and the gate electrode layer 145.

Figure 10:
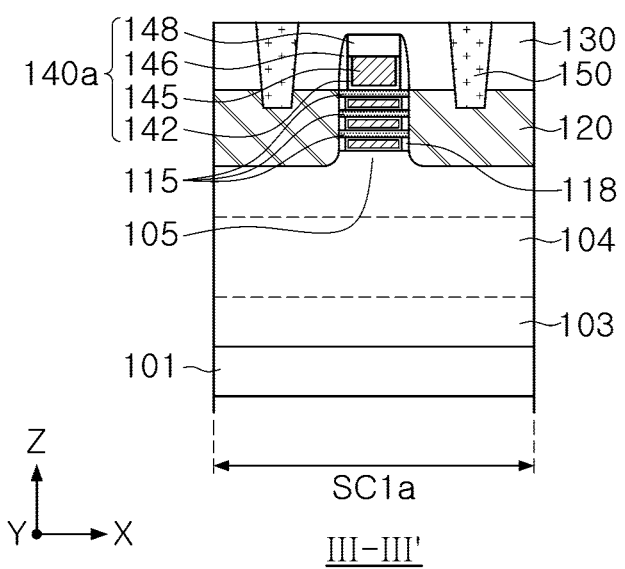
FIG. 10 is a cross-sectional view illustrating a semiconductor device according to example embodiments of the inventive concepts.

FIG. 10 is a cross-sectional view illustrating a semiconductor device according to example embodiments. In FIG. 10, a region corresponding to FIG. 9C is illustrated.

Referring to FIG. 10, a semiconductor device 100d may further include a plurality of channel layers 115 disposed on active regions 104 to be vertically spaced apart from each other, and internal spacer layers 118 disposed between the plurality of channel layers 115 and in parallel with a gate electrode layer 145. The semiconductor device 100d may include gate-all-around transistors in which a gate structure 140a is disposed between active fins 105 and the channel layers 115 and between the plurality of channel layers 115 in nanosheet form. For example, the semiconductor device 100d may include transistors having a multi-bridge channel FET (MBCFET®) structure formed by channel layers 115, source/drain regions 120, and a gate structure 140a.

The plurality of channel layers 115 may be disposed on the active region 104 in a plurality of two or more spaced apart from each other in a direction that is perpendicular to an upper surface of an active fin 105, for example, in a Z direction. The channel layers 115 may be connected to the source/drain regions 120, and may be spaced apart from upper surfaces of the active fin 105. The channel layers 115 may have the same or similar width as the active fin 105 in the Y direction, and may have the same or similar width as the gate structure 140a in the X direction. However, according to some embodiments, the channel layers 115 may have a reduced width such that lateral surfaces are located below the gate structure 140a in the X direction.

The plurality of channel layers 115 may be formed of a semiconductor material, and may include, for example, at least one of silicon (Si), silicon germanium (SiGe), or germanium (Ge). The channel layers 115 may be made of, for example, the same material as the substrate 101. The number and shapes of the channel layers 115, forming one channel structure, may be variously changed in embodiments. For example, according to some embodiments, a channel layer may be further provided in a region in which the active fin 105 is in contact with the gate electrode layer 145.

The gate structure 140a may be disposed to extend over the active fins 105 and the plurality of channel layers 115 to intersect the active fins 105 and the plurality of channel layers 115. Channel regions of transistors may be formed in the active fins 105 and the plurality of channel layers 115, intersecting the gate structure 140a. In this embodiment, a gate insulating layer 142 may be disposed not only between the active fin 105 and the gate electrode layer 145, but also between the plurality of channel layers 115 and the gate electrode layer 145. The gate electrode layer 145 may be disposed on the active fins 105 to fill between the plurality of channel layers 115 and extend over the plurality of channel layers 115. The gate electrode layer 145 may be spaced apart from the plurality of channel layers 115 by the gate insulating layer 142.

Internal spacer layers 118 may be disposed between the plurality of channel layers 115 and in parallel with the gate electrode layer 145. The gate electrode layer 145 may be spaced apart from and may be electrically separated from the source/drain regions 120 by internal spacer layers 118. The internal spacer layers 118 may have a planar lateral surface opposite to the gate electrode layer 145, or may be convexly rounded inward toward the gate electrode layer 145. The internal spacer layers 118 may be formed, for example, of an oxide, a nitride, or an oxynitride, and in particular, may be formed of a low-k film. According to some embodiments of the semiconductor device 100d, the internal spacer layers 118 may be omitted.

In example embodiments, the semiconductor device 100d having the MBCFET® structure may be additionally disposed, together with the semiconductor device 100c of FIGS. 8 and 9A to 9C, in a region of a semiconductor device. In example embodiments, a semiconductor device may include a vertical field effect transistor (FET) in which an active region extending perpendicular to the upper surface of the substrate 101 and a gate structure surrounding the active region are arranged in at least one region.

By configuring and arranging standard cells to optimize arrangement of a common pattern region, a method of designing a layout of a semiconductor device having improved integration and reliability, and a method for manufacturing the semiconductor device using the same may be provided.

Various advantages and effects of the present inventive concepts are not limited to the above description, and can be more easily understood in the process of describing specific embodiments of the present inventive concepts.

While example embodiments have been illustrated and described above, it will be apparent to those skilled in the art that modifications and variations could be made without departing from the scope of the present inventive concepts as defined by the appended claims.

What is claimed is:

1. A method of designing a layout of a semiconductor device, comprising:
   preparing a standard cell library comprising information on standard cells;
   determining a layout of a common pattern region in consideration of a local layout effect based on the standard cell library, wherein the common pattern region comprises a common active pattern;
   adding the common pattern region having a cell height that is identical to a cell height of each of the standard cells to opposite sides of one or more of the standard cells; and
   arranging the standard cells to share the common pattern region between at least one pair of adjacent ones of the standard cells or to overlap the common pattern region based on a width of the common active pattern.

2. The method of claim 1, wherein, in the arranging the standard cells, the common pattern region is between the at least one pair of adjacent ones of the standard cells.

3. The method of claim 1, wherein, in the arranging the standard cells, the at least one pair of adjacent ones of the standard cells contact each other.

4. The method of claim 1, wherein the common active pattern is connected to a cell pattern in at least one of the standard cells, and
   wherein the arranging the standard cells is based on a comparison between the width of the common active pattern and a width of the cell pattern.

5. The method of claim 1, wherein the standard cells comprise a first portion that comprises a first active pattern having a first width and a second portion that comprises a second active pattern having a second width that is different from the first width,
   wherein the width of the common active pattern is equal to the first width, and
   wherein the common pattern region overlaps the first portion of the standard cells.

6. The method of claim 1, wherein a width of the common pattern region is smaller than a width of at least one of the standard cells.

* * * * *